Feb. 22, 1966   J. A. GDOWIK ETAL   3,236,121
PARKING BRAKE CONTROL
Filed Feb. 17, 1964   3 Sheets-Sheet 1
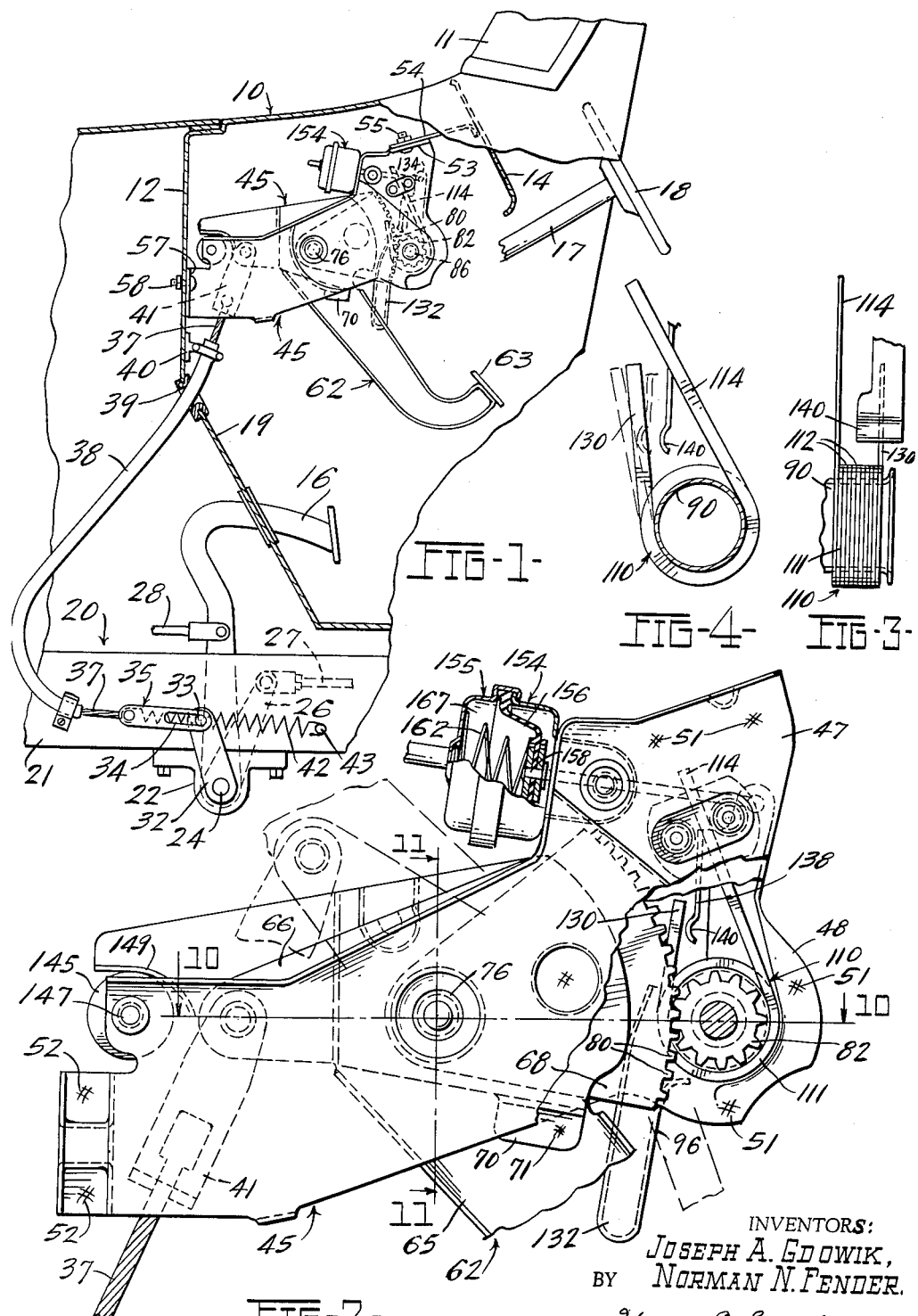
INVENTORS:
JOSEPH A. GDOWIK,
BY NORMAN N. FENDER.
Harry O. Ernsberger
ATT'Y.

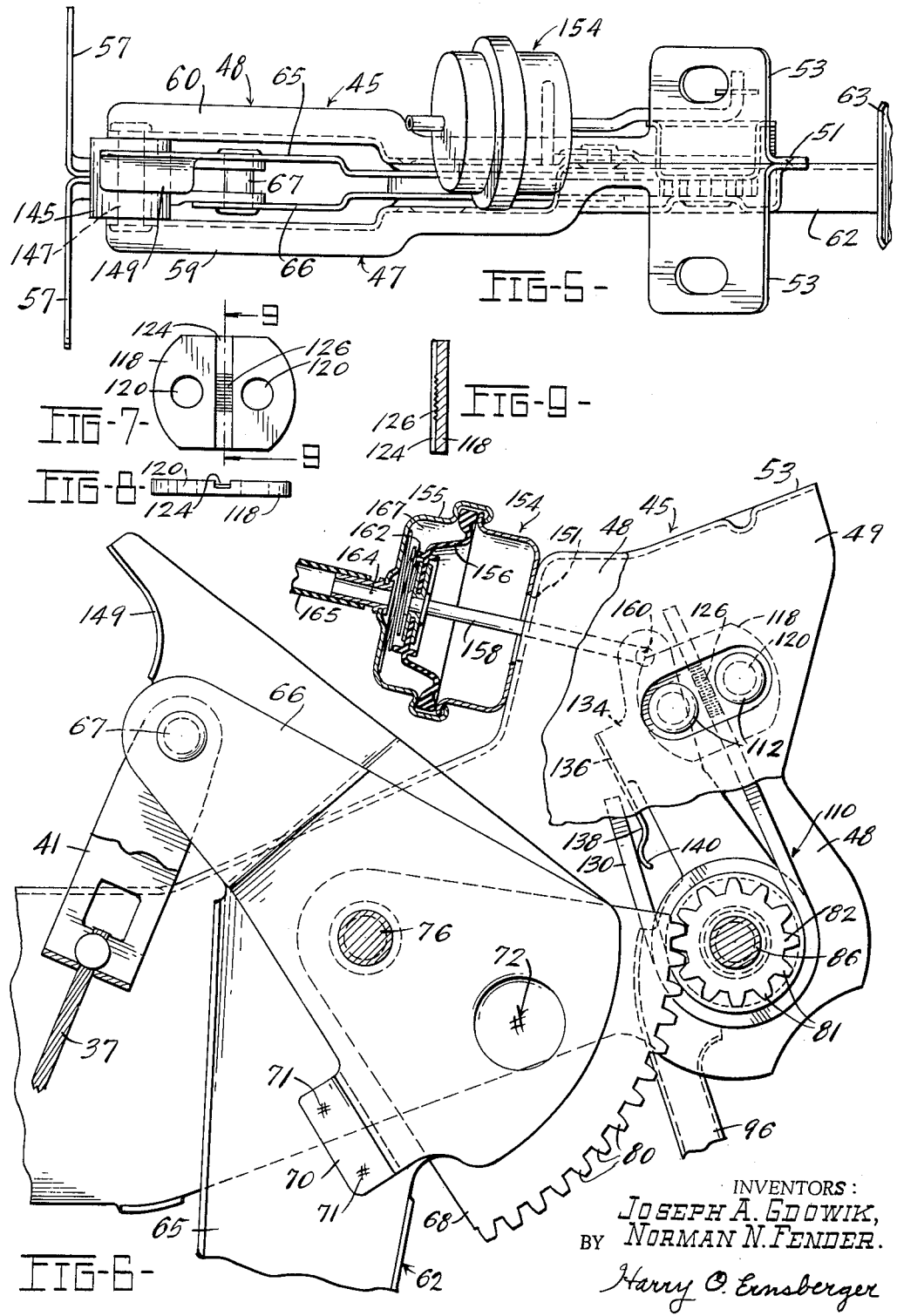

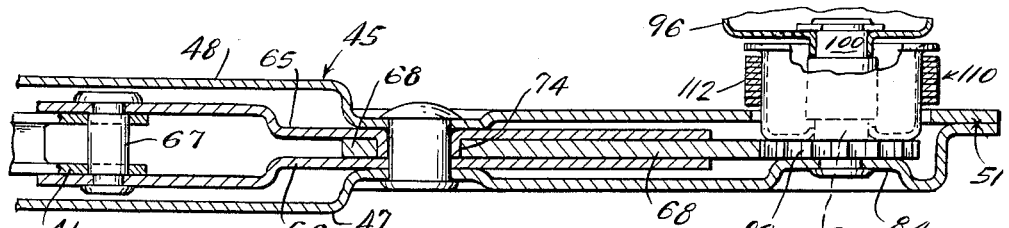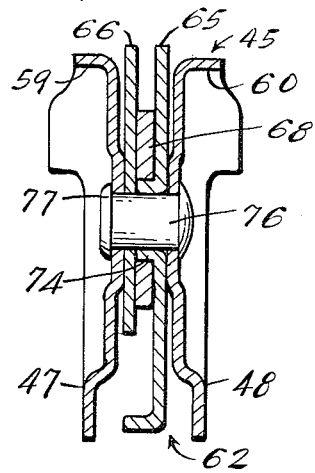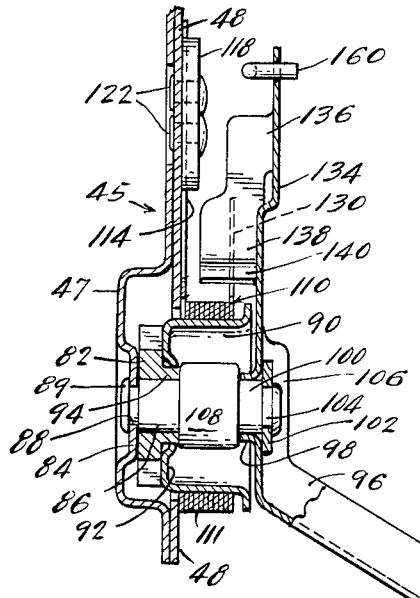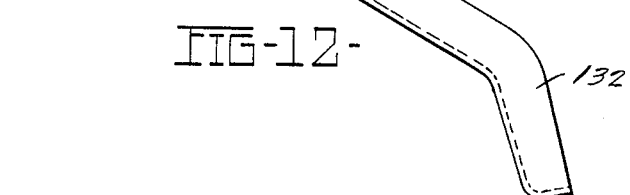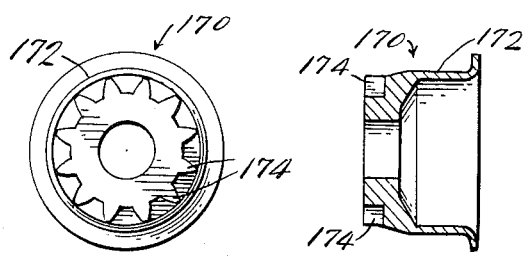

United States Patent Office 3,236,121
Patented Feb. 22, 1966

3,236,121
PARKING BRAKE CONTROL
Joseph A. Gdowik, Toledo, Ohio, and Norman N. Fender, Erie, Mich., assignors to Universal American Corporation, New York, N.Y., a corporation of Delaware
Filed Feb. 17, 1964, Ser. No. 345,450
4 Claims. (Cl. 74—531)

This invention relates to mechanism control and more particularly to mechanism for actuating and controlling the parking or emergency brakes of a vehicle.

The parking or emergency brakes of a vehicle are usually actuated or operated by manually operated or foot-operated mechanisms in association with retaining mechanism for holding the parking or emergency brakes in set position. It has been conventional practice to utilize ratchet and pawl mechanisms and friction rollers as retaining means for retaining the brake actuating mechanism in brake setting position, such retaining means being releasable by manual or power actuated means.

Recent developments have been made utilizing a coiled element frictionally engageable with a rotatable element connected through motion multiplying means with a brake actuating member wherein the friction between the rotatable element and the coiled element is effective to hold the brake actuating means in brake set position.

In devices of this character release of the brake actuating means is effected by relieving or reducing friction between the coiled element and the rotatable element whereby the brake actuating means, under influence of brake springs, is returned to brake releasing position. In such devices one end of the coiled element is anchored to a relatively stationary support, the other end being relatively movable to effect release of the rotatable element. The coiled element is inherently stressed and configurated to normally exert a high frictional force on the rotatable element to prevent rotation thereof in a direction effective to permit release of the brake actuating means.

In order to retain the brake actuating means in brake set position, substantial stresses are developed in the coiled element and particularly in the region of the element anchored to a stationary support. When the brake actuating means is moved to brake setting position, the rotatable element is rotated to a retaining position and, upon removal of the brake applying force from the brake actuating means, the coiled element is subjected to substantial tensile or stretching forces which tend to dislodge the anchored end region of the coiled element. In some instances the stresses are sufficiently high to fracture the anchored portion of the coiled element.

The present invention embraces the provision of a brake actuating means particularly usable for actuating the parking or emergency brakes of a vehicle embodying a rotatable element and coiled element means for retaining the brake actuating means in brake set position wherein the coiled element is anchored in a manner to effectively resist dislodgement by the forces or stresses developed in retaining the brake actuating means in brake setting position.

Another object of the invention is the provision of means for anchoring a coiled element of a retaining mechanism for retaining parking brakes in a set position wherein the coiled element is effectively secured in a manner to reduce the liability of the element to be fractured under the impact of forces developed in setting the brakes.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of a portion of an operator's compartment of a vehicle illustrating a form of mechanism control of the invention;

FIGURE 2 is a side elevational view of the mechanism control illustrated in FIGURE 1 with the mechanism in brake release position;

FIGURE 3 is a front elevational view of a coiled locking element and drum construction of the invention;

FIGURE 4 is an elevational view of the construction shown in FIGURE 3;

FIGURE 5 is a top plan view of the construction shown in FIGURE 2;

FIGURE 6 is a view similar to FIGURE 2 illustrating the brake actuating means in brake setting position;

FIGURE 7 is a plan view of an anchor member for the coiled element;

FIGURE 8 is a side elevational view of the anchor element shown in FIGURE 7;

FIGURE 9 is a sectional view of the anchor element, the view being taken substantially on the line 9—9 of FIGURE 7;

FIGURE 10 is a sectional view taken substantially on the line 10—10 of FIGURE 2;

FIGURE 11 is a sectional view taken substantially on the line 11—11 of FIGURE 2;

FIGURE 12 is a detail sectional view illustrating the coiled element and drum construction and a release means associated with the coiled element;

FIGURE 13 is an end view illustrating a modified form of combined gear and drum construction, and FIGURE 14 is a sectional view of the construction shown in FIGURE 13.

While the mechanism control of the invention is particularly usable for actuating and controlling the parking or emergency brakes of a vehicle, it is to be understood that the mechanism control of the invention may be utilized wherever it may be found to have utility.

Referring to the drawings in detail and initially to FIGURE 1, there is illustrated a portion of the operator's compartment of an automotive vehicle and the portion of the vehicle frame construction. The illustrated portion of the vehicle includes a cowl 10, a windshield 11, a dashboard or firewall 12, an instrument panel 14, a service brake pedal 16, a steering post 17, and a steering wheel 18. A floor construction 19 of the operator's compartment forms a continuation of the firewall 12. The chassis frame 20 is inclusive of parallel frame members, one of which is shown at 21, the frame members being joined by cross members or struts (not shown) of conventional construction.

Secured to the side frame members 21 are brackets 22, one of which is shown in FIGURE 1, the brackets journally supporting a transversely extending shaft 24. Fixed on the shaft 24 is an arm 26 connected by a rod 27 with the vehicle parking or emergency brakes associated with road wheels of the vehicle (not shown), the parking brakes being of conventional construction. The service brakes of the vehicle are adapted to be operated by the brake pedal 16 journaled on the shaft 24. A rod 28 connected to the pedal 16 is arranged to actuate conventional hydraulic means (not shown) for setting the service brakes of the vehicle.

Secured on the shaft 24 is a second arm 32 provided at its distal end with a pin 33 arranged for traverse in a slot 34 provided in a connecting link 35. The link 35 is connected to the lower end of a flexible cable 37 enclosed within a tubular sheath 38, the sheath and cable extending through a rubber grommet 39 disposed in an opening in the floor 19, the upper end of the sheath being anchored to the firewall by means of a bracket 40. The upper end of the flexible cable 37 is equipped with a clevis 41 for pivotal connection with the parking brake actuating lever construction hereinafter described.

One end of a contractile coil spring 42 is anchored by a pin 43 to the frame member 21, the other end of the spring being connected with the link 35. The spring 42 and the conventional brake shoe retracting springs (not shown) normally bias the link in a right-hand direction toward brake release position.

The parking brake actuating and control mechanism is mounted on a support means or frame 45 fashioned of two mating sheet metal sections 47 and 48 welded together at regions indicated at 50 and 51 in FIGURE 2.

The end regions of the frame members 47 and 48 adjacent the instrument panel 14 are formed with laterally extending flanges or pad portions 53 adapted to be secured to a bracket 54 by means of bolts 55, the bracket 54 being welded or otherwise secured to the instrument panel 14. The end regions of the support members 47 and 48 adjacent the firewall 12 are fashioned with transversely extending flanges or pad portions 57 adapted to be secured to the firewall 12 by means of bolts 58. The upper portions of the support sections 47 and 48 are formed with laterally extending reinforcing flanges 59 and 60, shown in FIGURES 5 and 11.

The brake actuating mechanism includes a brake actuator, lever or member 62 pivotally or articulately mounted upon the support means 45 for relative movement. In the form illustrated in the drawings, the actuator 62 is a foot-operated lever provided at its lower end with a foot pad portion 63. It is to be understood that power means may be provided to operate the actuator 62, if desired.

In the embodiment illustrated the foot-operated lever or member 62 is formed of two sections, a primary section 65 and a second section 66, the section 65 being in the shape of a foot-operated pedal lever and the secondary section 66 being of generally sector shape.

A pin or shaft 67, extending through openings in the lever sections and clevis 41, connects the lever 62 with the brake cable 37. Disposed between the lever sections 65 and 66 is a plate or sector 68.

The secondary section 66 is provided with a pad portion 70 welded to the lever section 65 as shown at 71 in FIGURE 6. The lever sections 65 and 66 are welded to the plate 68 at the circular recessed region indicated at 72 in FIGURE 6. The lever construction 62 is fulcrumed on the support means 45 in the manner particularly illustrated in FIGURES 10 and 11. The lever section 65 is fashioned with a laterally extending circular flange 74, shown in FIGURES 10 and 11 providing a hub which is snugly received in an opening in the plate 68.

The support sections 47 and 48 and the lever section 66 are fashioned with aligned openings to accommodate a fulcrum pin or rivet 76, the interior surface of the circular flange 74 being of a dimension to receive the fulcrum pin 76. In this manner the lever construction 62 is fulcrumed upon the pin 76 and the flange portion 74 of the lever section 65 provides a substantial bearing area engagable with the pin 76 to minimize wear between the lever construction 62 and the fulcrum pin 76.

After assembly of these components in the positions shown in FIGURE 11 the end of the rivet 76 is swaged as at 77 to secure the components in assembled relation.

In this manner the lever construction 62 is fulcrumed on the fulcrum pin or rivet 76 for pivotal movement relative to the support construction or support means 45. The plate or sector member 68 has an arcuately shaped peripheral region provided with a plurality of teeth 80 constituting a rack portion, the teeth of which are enmeshed with the teeth 81 of a gear or pinion 82, as shown in FIGURES 2 and 6.

As shown in FIGURES 10 and 12 the support section 47 is configurated with an inwardly depressed circular region 84, the depressed portion 84 providing a means to which is secured a trunnion or shaft member 86 upon which is journally mounted the gear 82. The trunnion or journal pin 86 is fashioned with a tenon portion 88 of reduced diameter which extends through an opening in the depressed portion 84, the pin 86 being secured to portion 84 by swaging an end of the pin or shaft, as shown at 89, into snug engagement with the exterior surface of the depressed portion 84.

A generally cylindrically shaped hollow member or drum 90 formed of metal is fashioned with a hub portion 92 which is snugly fitted onto a tenon or hub portion 94 of the gear 82 and is securely welded to the gear. The arrangement is inclusive of a release means or member 96 for a lever retaining means to be hereinafter described, the member 96 being preferably formed of sheet metal is configurated with a laterally extending circular flange 98 providing a cylindrical bearing means through which extends a portion 100 of the shaft or pin 86, the member 96 being journally supported on the shaft portion 100.

A washer 102 is received on a second tenon portion 104 of the shaft 86 adjacent the portion 100, a region of the tenon 104 being swaged as at 106 into engagement with the washer 102 whereby the release member 96 is maintained in assembled relation on the portion 100 and is thereby arranged for relative pivotal movement about the axis of the shaft 86. An enlarged central portion 108 of the shaft 86 is disposed between the gear 82 and the flange 98 of member 96 to maintain these components in proper spaced relation. As the gear 82 and the drum 90 are welded together, these components form a unit mounted for rotation about the axis of the shaft or trunnion pin 86.

A lever retaining or locking means 110 is cooperatively associated with the drum or cylindrical member 90 and is frictionally engageable with the exterior surface thereof providing an effective means for retaining or holding the lever construction 62 and parking brake mechanism connected therewith in brake setting positions. The retaining or locking means 110 is fashioned with a coil spring portion 111 provided by a plurality of close convolutions 112, the strip of material providing the means 110 being of hardened spring steel or similar material.

The strip material forming the retaining means 110 being comparatively thin in relation to its width as particularly shown in FIGURES 3 and 4. The convolutions 112 are flat and are wound in close relation as illustrated in the drawings.

The interior diameter of the coil spring portion 111 of the member or means 110 is of a dimension to normally snugly fit onto the exterior cylindrical surface of the drum 90, the edges of the convolutions 112 of the coil spring portion engaging the drum being preferably rounded.

The coils 112 are wound and prestressed in hardening whereby they normally frictionally grip the exterior surface of the drum 90 to hold the parking brakes in set position. The locking or retaining member 110 is formed with a projecting terminal portion 114 which is adapted to be anchored to the support section 48 in a manner illustrated in FIG. 12. The method and means of anchoring the projecting terminal portion 114 to the support section 48 is an important feature of the invention.

When the stresses on the locking element 110 of retaining the brakes in brake setting position are communicated through the ratchet plate 68 and gear 82 to the locking element, tension in the terminal portion 114 is of substantial magnitude. In order to provide a satisfactory lever locking or retaining means, the terminal portion must be positively anchored against dislodgement. The anchor means or member provided for securing the terminal projection 114 against dislodgement as illustrated in detail in FIGURES 7 through 9.

The anchor or clamp member comprises a substantially flat plate 118 provided with openings 120 adapted to accommodate securing rivets 122 for fixedly securing the anchor member 118 to the support or frame section 48. The anchor member or plate 118 is fashioned with a shallow rectilinear groove or recess 124 of a width to snugly accommodate the terminal projection 114 of the retaining means 110. The floor of the recess 124 is provided with a serrated or roughened region 126 which may be coined or otherwise fashioned in the floor of the recess 124 providing upwardly extending ridges or projections for direct engagement with a surface of the terminal portion or projection 114 when the latter is assembled with the anchor member.

Thus the recess 124 is of a shallow dimension so that when the anchor member 118 is secured in assembled position with the terminal member 114 in the recess 124 and the rivets 122 swaged into securing relation with the support section 48, the terminal portion or projection 114 is positively held between a surface of the support section 48 and roughened region 126 against dislodgement by high stresses and impact of brake setting operations. The roughened or serrated region may be formed on the support means or support section 48 to engage the terminal portion 114, or the terminal portion 114 may be formed with a roughened or serrated surface area for engagement with the support means or with the bottom of the recess 124 in the clam or anchor member 118.

The opposite end region of the retaining means 110 is provided with a second terminal portion 130 which is unsecured and is disposed for freedom of movement to enable the convolutions to normally grip the surface of the drum 90.

The hardened and prestressed convolutions 112 of the spring portion inherently frictionally grip the exterior surface of the drum 90, the gripping characteristics of the coiled spring portion 111 being adequate to retain or hold the parking brake actuating mechanism in brake set position. The convolutions 112 of the spring portion 111 are coiled in a direction whereby rotation of the drum 90 during brake setting movement of the lever or actuator 62 tends to unwind the convolutions in a counterclockwise direction as viewed in FIGURES 1, 2 and 6 thus facilitating setting of the parking brakes with a minimum of frictional drag between the drum 90 and the coil spring portion 111.

The radius of the toothed or rack portion of the plate 68 about the axis of the fulcrum pin 76 is several times greater than the radius of the pinion 82 thus providing a motion multiplying or force reducing means or arrangement through the toothed plate and pinion construction whereby substantial rotation of the pinion 82 occurs as compared to the angular distance through which the plate 68 is moved by the lever 62 in setting the brakes, thus proportionately reducing the locking force required of the coil means of member 110 to hold or retain the drum 90 in a brake setting position.

Release of the coil portion 111 of means 110 from gripping engagement with the drum 90 is effected by moving the free terminal portion 130 in a direction tending to unwind the coil portion 111 of the means 110 to release the grip or locking force of the coil portion on the drum to effect a release of the brake setting means. It is found that a very slight relative movement of the distal or free terminal portion 130 of member 110 in a direction tending to unwind the coil spring is sufficient to release or render ineffective the frictional grip of the convolutions 112 on the drum 90 whereby the conventional brake springs and spring 42 acting through the cable 37 return the lever member or pedal 62 to its initial brake release position.

The release member 96 is adapted to move the terminal portion 130 away from the terminal portion 114 to release the gripping force of the spring 111 on the drum 90. With particular reference to FIGURE 12, the release member 96 is fashioned with a manipulating or grip portion 132 which extends downwardly from the support means 45 as shown in FIGURES 1 and 12. The member 96 is fashioned with an upwardly extending portion or arm 134 and extending transversely from the portion 134 is a flange portion 136, a downwardly extending projection 138 terminating in an arcuately shaped region or portion 140 normally disposed adjacent but spaced from the terminal portion 130 as shown in FIGURE 2.

The member 96 is journaled upon the portion 104 of shaft 86 and when the member 96 is rotated in a counterclockwise direction, as viewed in FIGURES 1, 2 and 6, the curved portion 140 of the projection 138 engages the terminal portion 130 of the drum retaining means and moves the terminal portion 130 in a left-hand direction tending to unwind the convolutions 112 and thereby release the gripping force of the convolutions on the drum 90 to release the brake actuating lever for movement to its initial brake-release position.

Means is provided for cushioning the impact of the return movement of the lever 62 and its associated components to brake release position. Disposed between the support sections 47 and 48 is a cylindrically shaped buffer or abutment member 145 fashioned of semi-hard rubber or other resilient material. The buffer 145 is supported by a rivet or pin 147 extending through aligned openings in the support sections and the buffer, as particularly shown in FIGURES 2 and 5. The upper end region of the lever section 65 is integrally provided with a transversely extending arcuately shaped pad portion 149 which is adapted to engage the buffer 145 when the lever 62 reaches brake release position, shown in FIGURE 2.

In addition to the manually operable release member 96, power means may be employed to effect movement of the member 96 to release the coiled member 110 from gripping or locking engagement with the drum 90.

Mounted upon a pad portion 151 of the support section 48 is a servo-motor 154 which is preferably of a conventional fluid-actuated diaphragm type which includes a two section housing 155 with a flexible diaphragm 156 of flexible non-metallic material disposed between the housing sections.

The diaphragm 156 is connected with one end of a rod 158, the opposite end having a transversely extending extremity 160 which is received in an opening provided in the upper end of portion 134 of the release member 96 shown in FIGURE 12. An expansive coil spring 162 is disposed between an end wall of the housing 155 and the diaphragm 156 for normally urging the rod 158 in a right-hand directions viewed in FIGURES 2 and 6, maintaining the member 96 out of engagement with the terminal portion 130 of the coiled member 110.

The chamber of the housing 155 of the servo-motor at the left side of the diaphragm, as viewed in FIGURE 6, is provided with a spud or nipple 164 connected by a flexible tubular member 165 with a source of reduced or subatmospheric pressure as, for example, the intake manifold of the engine of the vehicle. Valve means (not shown) of conventional construction is associated with the tube 165 or otherwise arranged to control the transmission of reduced pressure in the cshamber 167 in the housing 155 whereby the reduced pressure flexes the diaphragm 156 in a left-hand direction as viewed in FIGURES 2 and 6.

This flexure of the diaphragm effects lengthwise movement of the rod 158 and pivotal movement of the member 96 to engage the pad portion 140 thereof with the terminal portion 130 of the coiled element 110 to release the gripping force of the coiled element on the drum 90.

It is to be understood that other types of motive power may be used to actuate the release member 96. The chamber in the servo-motor housing 155 at the right-hand side of the diaphragm 156 is vented to facilitate movement of the diaphragm.

FIGURE 6 illustrates the components of the servo-motor and member 96 in a position releasing the coiled means 111 from locking engagement with the drum 90. The number of convolutions in the coiled member or spring portion 111 may be three or more, and tests have indicated that about seven convolutions provide an effective operating arrangement for gripping the drum 90 to retain the parking brakes in set position.

The method of operation of the arrangement is as follows: The components of the control mechanism are illustrated in brake release position in FIGURES 1 and 2, the portion 149 of the brake actuating lever 62 engaging the buffer 145 predetermining the release position of the lever. The member 96 is normally biased toward release position under the influence of the expansive coil spring 162 in the servo-motor 154. If the power actuated release mechanism is not employed in the construction, a spring means of conventional construction is utilized to bias the member 96 toward release position.

With normal or atmospheric pressure maintained in the chamber 167 of the servo-motor, the release member 96 is normally held in release position. When the vehicle operator desires to set the parking brakes, the pedal lever 62 is swung by foot pressure on a pad 62 about its fulcrum 76 in a clockwise direction as viewed in FIGURES 1, 2 and 6, effecting upward movement of the brake cable 37 and rotation of the sector plate 68, the teeth on the sector plate effecting counterclockwise rotation of the pinion or gear 82.

As the pinion 82, during this operation is moved in a counterclockwise direction, it tends to unwind the coiled or spring portion 111 of the locking means 110 so that only minor frictional force is present between the convolutions 112 and the drum 90 which is easily overcome by the foot pressure on the lever 62. When the brakes have been moved to set position, rotation of the gear 62 ceases and the inherent stress in the coiled element 111 securely grips the drum 90 to prevent reverse rotation, thereby holding the brakes in set position.

When it is desired to release the brakes, the operator may manually move the member 96 about its pivotal support in a counterclockwise direction, as viewed in FIGURES 2 and 6, to engage the portion 140 of member 96 with the terminal portion 130 of the coiled locking element to move the terminal portion 130 to the broken line position indicated in FIGURE 4.

This movement tends to unwind the convolutions 112 releasing the drum 90 and gear 82 which, through intermeshment of the gear with the sector plate 68, permits the brakes to be released under the influence of the brake springs (not shown).

Where the power release means 154 is employed, the valve means (not shown) connected with the tubular member 165 is usually interconnected with the vehicle transmission control whereby movement of the transmission control out of neutral position actuates the valve means to establish sub-atmospheric pressure in the chamber 167, moving the diaphragm 156 to the position shown in FIGURE 6, which movement transmitted through the rod 158 effects pivotal movement of member 96 to release position. After release of member 96 is effected, the valve means controlling the pressure in chamber 167 is arranged to reestablish atmospheric pressure in said chamber in a conventional manner, permitting the expansive force of the spring 162 to return the member 96 to its normal position out of engagement with the terminal portion 130.

FIGURES 13 and 14 illustrate a modified arrangement of forming the drum and associated pinion construction. In this form, a single member 170 is fashioned with a drum portion 172 and gear teeth 174 as an integral unit. The gear portion provided by the teeth 174 and the drum portion 172 function in the same manner as the gear 82 and the drum 90 hereinbefore described.

The arrangement of the invention provides an effective means for maintaining a brake operating pedal or lever in brake setting position without any cable "back-off", the coiled element 110 providing an effective retaining means for holding the brakes in set position but one which is easily releasable by application of a small force applied to the distal terminal portion 130 of the coiled element. Furthermore the anchoring means for the terminal portion 114 prevents dislodgement and minimizes tendency of fracturing this component as there are no lateral forces or forces tending to distort the terminal portion 114.

It is apparent that, within the scope of the invention, modifications and different arrangements may be made other than as herein disclosed, and the present disclosure is illustrative merely, the invention comprehending all variations thereof.

We claim:

1. Mechanism for controlling parking brakes of a vehicle, in combination, support means, a brake actuator pivotally mounted by the support means for movement relative thereto, a rotatable element journaled for rotation on an axis spaced from the pivotal axis of the actuator, motion transmitting means establishing operative connecting between the actuator and rotatable element, said motion transmitting means including a toothed rack movable with the actuator, a plurality of teeth on the rotatable member engaged with the teeth of the rack whereby relative movement of the actuator effects rotation of the rotatable element, a coiled element embracing the rotatable element and frictionally engaging the rotatable element to retain same in positions to which it is moved by the actuator, said coiled element having terminals, means anchoring one terminal including a clamp member having an elongated groove formed therein of a dimension to snugly receive said one terminal, means securing the clamp member to the support means to securely anchor said one terminal against relative movement, the other terminal being movable relative to the anchored terminal to effect release of the coiled element with the rotatable element.

2. Mechanism for controlling parking brakes of a vehicle, in combination, support means, a brake actuator pivotally mounted by the support means for movement relative thereto, a rotatable element journaled for rotation on an axis spaced from the pivotal axis of the actuator, motion transmitting means establishing operative connection between the actuator and rotatable element, said motion transmitting means including a toothed rack movable with the actuator, a plurality of teeth on the rotatable member engaged with the teeth of the rack whereby relative movement of the actuator effects rotation of the rotatable element, a coiled element embracing the rotatable element and frictionally engaging the rotatable element to retain same in positions to which it is moved by the actuator, said coiled element having terminals, clamp means for anchoring one terminal to the support means, one of said means having a roughened surface engaging a portion of said one terminal, means securing the clamp means to the support means, the other terminal being movable relative to the anchored terminal to effect release of the coiled element with the rotatable element.

3. Mechanism for controlling parking brakes of a vehicle, in combination, support means, a brake actuator pivotally mounted by the support means for movement relative thereto, a rotatable element formed with a hollow cylindrical portion journaled for rotation on an axis spaced from the pivotal axis of the actuator, motion transmitting means establishing operative connection between the actuator and rotatable element whereby relative movement of the actuator effects rotation of the rotatable element, a constriction element embracing the hollow cylindrical portion of the rotatable element frictionally retaining same in positions to which it is moved by the actuator, said constriction element having terminals, clamp means anchoring one terminal to the support means, said motion transmitting means including plate means movable with the brake actuator and having a rack portion, said rotatable element having gear teeth integrally formed therein adjacent the cylindrical portion, said gear teeth being enmeshed with the rack portion of said plate means, the other terminal of the constriction element being relatively movable to effect release of the constriction element with the rotatable element.

4. Mechanism for controlling parking brakes of a vehicle in combination, support means, a brake actuator pivotally mounted by the support means for movement relative thereto, a rotatable element journally mounted by the support means on an axis spaced from the pivotal axis of the actuator, said rotatable element having a cylindrical portion, motion transmitting means establishing operative connection between the actuator and rotatable element whereby relative movement of the actuator effects rotation of the rotatable element, a coiled element embracing the cylindrical portion of the rotatable element frictionally engaging the rotatable element to retain same in positions to which it is moved by the actuator, said coiled element having terminals, means anchoring one terminal to the support means, said motion transmitting means including a plate movable concomitantly with the brake actuator and having a rack portion, said rotatable element having gear teeth integrally formed therein adjacent the cylindrical portion, said gear teeth being enmeshed with the rack portion of said plate, said other terminal of the coiled element being relatively movable to effect release of the coiled element with the rotatable element.

References Cited by the Examiner

UNITED STATES PATENTS

| | | | |
|---|---|---|---|
| 823,971 | 6/1906 | Remondy | 74—531 X |
| 855,381 | 5/1907 | Bearse | 24—135.1 |
| 1,914,510 | 6/1931 | Johnson et al. | 74—531 |
| 2,117,925 | 5/1938 | Von Meter | 74—531 X |
| 3,149,500 | 9/1964 | Swats et al. | 74—531 |

FOREIGN PATENTS 754,786  8/1956  Great Britain.

MILTON KAUFMAN, *Primary Examiner.*
BROUGHTON G. DURHAM, *Examiner.*